(12) United States Patent
Dittrich et al.

(10) Patent No.: US 11,922,742 B2
(45) Date of Patent: Mar. 5, 2024

(54) DATA LOGGING SYSTEM FOR COLLECTING AND STORING INPUT DATA

(71) Applicant: Aptiv Technologies Limited, St. Michael (BB)

(72) Inventors: Ralf Dittrich, Düsseldorf (DE); Pekka Herzogenrath, Wuppertal (DE); Moritz Schrey, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 361 days.

(21) Appl. No.: 17/168,003

(22) Filed: Feb. 4, 2021

(65) Prior Publication Data

US 2021/0248842 A1 Aug. 12, 2021

(30) Foreign Application Priority Data

Feb. 11, 2020 (EP) .................................... 20156714

(51) Int. Cl.
  *G07C 5/08* (2006.01)
  *B60W 60/00* (2020.01)
  *G06F 13/42* (2006.01)

(52) U.S. Cl.
  CPC .......... *G07C 5/085* (2013.01); *B60W 60/001* (2020.02); *G06F 13/4282* (2013.01); *G06F 2213/0026* (2013.01)

(58) Field of Classification Search
  None
  See application file for complete search history.

(56) References Cited

U.S. PATENT DOCUMENTS

| 5,920,465 A | 7/1999 | Tanaka |
| 6,246,933 B1 | 6/2001 | Baque |

(Continued)

FOREIGN PATENT DOCUMENTS

| CN | 104375959 | 2/2015 |
| DE | 102018202230 | 8/2019 |

(Continued)

OTHER PUBLICATIONS

Frank, Aaron. "Taking the complexity out of PCI Express configuration to optimize HPEC system design." Military Embedded Systems, Apr. 18, 2017, https://militaryembedded.com/radar-ew/rugged-computing/taking-complexity-of-hpec-system-design (Year: 2017).*

(Continued)

*Primary Examiner* — Peter D Nolan
*Assistant Examiner* — Jacob Kent Besteman-Street
(74) *Attorney, Agent, or Firm* — Harness, Dickey & Pierce, P.L.C.

(57) ABSTRACT

The system has a processing unit that collects input data and a peripheral storage device, connected to the processing unit via an interface system, for recording event data in a non-volatile memory, wherein the event data are input data stored for a recording time period relative to a time zero representing a time when a trigger event occurs. The peripheral storage device has also a volatile memory, and the data logging system stores the input data in the volatile memory of the peripheral storage device, when input data are being collected, and, when a trigger event occurs, makes a copy of stored input data as a backup from the volatile memory of the peripheral storage device into the non-volatile memory of the peripheral storage device.

20 Claims, 2 Drawing Sheets

(56) References Cited

U.S. PATENT DOCUMENTS

| | | |
|---|---|---|
| 8,806,115 B1 | 8/2014 | Patel et al. |
| 9,160,091 B2 | 10/2015 | Tsai et al. |
| 9,195,542 B2 | 11/2015 | McKelvie et al. |
| 9,451,691 B2 | 9/2016 | Kim et al. |
| 9,946,610 B2 | 4/2018 | Kinoshita |
| 9,966,678 B2 | 5/2018 | Chiang et al. |
| 11,013,106 B1 | 5/2021 | Schrey et al. |
| 2002/0183905 A1* | 12/2002 | Maeda .............. B62D 41/00 701/33.4 |
| 2003/0168839 A1* | 9/2003 | Miyoshi ............ B60R 21/0173 280/735 |
| 2007/0032930 A1* | 2/2007 | Ozawa ............... G01D 9/005 701/33.4 |
| 2007/0040365 A1* | 2/2007 | Asada ............... B60R 21/0132 280/735 |
| 2007/0137886 A1 | 6/2007 | Yen |
| 2008/0278903 A1 | 11/2008 | Ni et al. |
| 2009/0058995 A1 | 3/2009 | Yamashita |
| 2009/0204295 A1* | 8/2009 | Klug ................. G07C 5/085 701/45 |
| 2010/0170953 A1 | 7/2010 | Schaade |
| 2010/0238009 A1* | 9/2010 | Cook ................ G07C 5/00 340/439 |
| 2011/0112719 A1* | 5/2011 | Marumoto ......... G01F 9/008 340/439 |
| 2014/0026019 A1 | 1/2014 | Sawada |
| 2017/0018541 A1 | 1/2017 | Yi et al. |
| 2017/0233000 A1 | 8/2017 | Fujimoto et al. |
| 2018/0268621 A1* | 9/2018 | Oz ..................... G07C 5/02 |
| 2018/0336144 A1* | 11/2018 | Olarig ............... G06F 12/1433 |
| 2019/0042414 A1 | 2/2019 | Juenemann et al. |
| 2019/0287319 A1 | 9/2019 | Golov |
| 2019/0302766 A1 | 10/2019 | Mondello et al. |
| 2020/0402328 A1* | 12/2020 | Westlund ........... G07C 5/085 |
| 2021/0271413 A1 | 9/2021 | Herzogenrath et al. |
| 2023/0282044 A1* | 9/2023 | Brodt ................ G07C 5/085 701/29.1 |

FOREIGN PATENT DOCUMENTS

| | | |
|---|---|---|
| GB | 2126013 | 3/1984 |
| GB | 2497674 | 6/2013 |
| WO | 2004023859 | 3/2004 |
| WO | 2016114755 | 7/2016 |

OTHER PUBLICATIONS

"Extended European Search Report", EP Application No. 20160049.1, dated Jul. 31, 2020, 13 pages.

"Extended European Search Report", EP Application No. 20156714.6, dated Sep. 25, 2020, 10 pages.

"Extended European Search Report", EP Application No. 20152425.6, dated Jul. 23, 2020, 7 pages.

"Notice of Allowance", U.S. Appl. No. 17/116,826, dated Feb. 18, 2021, 8 pages.

"Notice of Allowance", U.S. Appl. No. 17/116,826, dated Apr. 5, 2021, 7 pages.

Pursuant to MPEP § 2001.6(b) the applicant brings the following co-pending application to the Examiner's attention: U.S. Appl. No. 17/116,826.

Pursuant to MPEP § 2001.6(b) the applicant brings the following co-pending application to the Examiner's attention: U.S. Appl. No. 17/170,754.

* cited by examiner

DATA LOGGING SYSTEM FOR COLLECTING AND STORING INPUT DATA

CROSS-REFERENCE TO RELATED APPLICATIONS

This application claims priority to European Patent Application Number 20156714.6, filed Feb. 11, 2020, the disclosure of which is hereby incorporated by reference in its entirety herein.

TECHNICAL FIELD

The present disclosure relates to the field of data logging systems for collecting and storing input data, comprising a processing unit that collects input data and a storage device for storing event data, that is, input data related to a trigger event.

BACKGROUND

Such a data logging system is a computing system that can be used for example in an automotive vehicle, in particular in a vehicle having an autonomous driving system or one or more ADAS (Advanced Driver-Assistance System(s)).

For safety reasons, data from a vehicle, for example data captured by sensors for autonomous driving or an ADAS, need to be logged, that is, collected and stored by the computing system of the vehicle.

When a trigger event like a crash occurs at "time zero to" or "start time" (the time of the trigger event), the data logging system is required to record event data, that is, particular data elements for a recording time period that is defined relative to the time zero.

The trigger event may be a crash (vehicle accident), a very fast deceleration of the vehicle, an unexpected power cut-off of the automotive battery that supplies the onboard electronic and/or computing components, or any other event that is to be investigated by analyzing logged data.

Generally, the recording time period relative to the time zero (time of the trigger event) starts before the time zero and ends at the time zero or, for some specific data elements, after the time zero. The duration of time of the recording time period may be specified by regulations. It is typically several seconds before the time zero and several milliseconds or a few seconds after the time zero.

As the time zero (considered as the time of the trigger event like a crash) is a priori unknown, it is required to permanently, or continuously, log data from the vehicle. Then, when a trigger event occurs at any time, the logged data are intended to be used in order to help in determining whether a human driver or an AD (Autonomous Driving) or an ADAS (Advanced Driver-Assistance System) was responsible for the trigger event, for example for the crash.

Several solutions exist to log (that is, to collect and store) event data, that are data recorded for a recording time period relative to a time zero representing a time when a trigger event, like a crash, occurs.

A first solution consists in storing the input data continuously and directly into a non-volatile memory in a mass storage device connected to the processing unit via an interface system. The mass storage device is intended to retain stored data even after power supply is cut off. It comprises a controller, a non-volatile memory, such as a NAND flash memory, and usually an additional volatile memory, for example a RAM or a cache memory. In operation, the processing unit collects the input data and directly transfers them to the peripheral mass storage device. An additional volatile memory in the mass storage device may be used as a temporary storage, before writing the data into the non-volatile memory, in order to limit the number of program cycles to the non-volatile memory, and also to temporarily store current operating data for the controller.

This first solution has the advantage that only a small amount of energy for backup power supply is needed to allow the non-volatile memory in the mass storage device to finish the ongoing write operation, when a trigger event occurs and power supply is also removed from the system. However, such a non-volatile memory has the main drawback that it has generally a limited number of program and erase cycles, also referenced as 'P/E cycles'. As previously explained, since a trigger event may occur at any time, the data from the vehicle need to be stored continuously. Over the lifetime of the vehicle, the amount of data to be stored can be huge such that it may exceed the number of allowed program and erase cycles of the non-volatile memory in the mass storage device. In order to circumvent this problem, either the memory size must be increased, which means a higher cost of the data logging system, or the amount of data to be recorded must be reduced, which may have the effect that not all relevant data can be stored in order not to exceed the allowed number of program and erase cycles. Depending on the kind of the non-volatile memory in the mass storage device, other drawbacks may arise. Hard disk drives and optical disks are non-volatile storage components having movable parts, which is not appropriate in a vehicle. Magnetoresistive random-access memory (MRAM) and Ferroelectric RAM (FeRAM, F-RAM or FRAM) are non-volatile random-access memories that have only a very small storage capacity (a few Mbytes). 3D XPoint is another kind of non-volatile memory, but no automotive grade product of 3D XPoint is available today. A NAND flash memory is a kind of memory commonly used in automotive, but it is limited to only some 1000 program and erase cycles.

A second solution consists in temporarily storing the data at first in a volatile system memory, for example a RAM (Random-Access Memory), attached to the processing unit, and then, when a trigger event occurs, making a copy of the stored data from the volatile system memory of the processing unit into a non-volatile memory within a mass storage device connected to the processing unit, in a burst, under control of a memory controller in the processing unit or under control of the processing unit. When a loss of power supply also occurs at the time of the trigger event, a backup power supply needs to be used to supply power to the components performing the data copy. The volatile system memory for temporary storage of the data can be a ring buffer memory that erases the oldest stored data when new input data must be stored by overwriting.

An advantage of the second solution is that, the number of program and erase cycles of the volatile system memory of the processing unit being considered as unlimited, it allows to store all the needed data over the lifetime of the vehicle. Another advantage is that the copy of the volatile system memory of the processing unit into the non-volatile memory in the mass storage device is performed only when a trigger event occurs, which represents a low number of program and erase cycles on the non-volatile memory in the mass storage device over the lifetime of the vehicle.

However, the second solution has a drawback that, in case of a power loss when a trigger event occurs, a high amount of backup power is required to allow the data logging system to copy the data from the volatile system memory of the processing unit to the non-volatile memory in the mass storage device.

US 2019/0042414 A1 discloses a non-volatile dual in line memory module (NVDIMM) emulation using a host memory buffer in a computing platform using a non-volatile storage device. When a power up event occurs for the computing platform, a host memory buffer is allocated in a system memory device in the computing platform and a backing store for the host memory buffer is copied from the non-volatile storage device to the host memory buffer in said system memory device. When a power down event or a flush event occurs for the computing platform, the host memory buffer is copied from the system memory device in the computing platform to the corresponding backing store for the host memory buffer in the non-volatile storage device. The solution disclosed in US 2019/0042414 A1 is close to the second solution previously described and presents the same advantages and drawbacks.

The present disclosure improves the situation with a better trade-off between limiting the number of program and erase cycles on a non-volatile memory for storing the event data when a trigger event occurs and limiting the amount of power required to perform the storage of these event data when the trigger event occurs.

SUMMARY

The present disclosure concerns a data logging system for collecting and storing input data, comprising a processing unit that collects input data and a peripheral storage device, connected to the processing unit via an interface system, for recording event data in a non-volatile memory, wherein said event data are input data stored for a recording time period relative to a time zero representing a time when a trigger event occurs, characterized in that the peripheral storage device also includes a volatile memory, and the data logging system stores the input data in the volatile memory of the peripheral storage device, when input data are being collected, and, when a trigger event occurs, makes a copy of stored input data as an event data set from said volatile memory of the peripheral storage device into said non-volatile memory of the peripheral storage device.

Such a data logging system presents the advantage that only the storage device needs to be powered when a trigger event occurs in order to safely make a copy of the event data.

A plurality of copies of input data, corresponding to a plurality of respective trigger events, can be made from the volatile memory of the peripheral storage device to the non-volatile memory of the peripheral storage device. The non-volatile memory can store a plurality of event data sets, corresponding to a plurality of trigger events. For each trigger event, a copy of the input data can be made to the non-volatile memory while the previously stored event data is preserved in the non-volatile memory. Copies of the input data can be made until a predetermined maximum amount of data is stored. This predetermined maximum amount of data can correspond to the storage capacity of the non-volatile memory or to the storage capacity of a part of said non-volatile memory that is allocated for event data storage. When the amount of data stored in the non-volatile memory has reached this maximum amount, the oldest event data is overwritten with the newest event data.

In a particular embodiment, when no trigger event occurs, the data logging system overwrites the input data stored in the volatile memory of the peripheral storage device, no copy of said input data stored in the volatile memory of the peripheral storage device being made into the non-volatile memory of the peripheral storage device.

The data logging system may comprise a volatile memory of the processing unit, like a volatile system memory, serving as temporary storage and working space for operating the processing unit. Said volatile memory of the processing unit is advantageously different from the volatile memory of the storage device.

The data logging system may further comprise a backup power supply device and, in case of a loss of power supply when said trigger event occurs, said backup power supply device advantageously supplies power only to the peripheral storage device.

The data logging system may equip a product, that is for example a moving body like a vehicle or any other kind of device like a medical device. In some embodiments, the data logging system makes a copy of stored input data from the volatile memory into the non-volatile memory, within the peripheral storage device, when one of the trigger events of the group including an impact event of the product equipped with said data logging system, a crash event of said product, a deceleration event of said product and a power down event of said product, occurs.

The volatile memory of the peripheral storage device can be implemented, at least partly, as a ring buffer memory. Advantageously, in case that no trigger event occurs, the volatile memory stores new input data by overwriting the oldest stored input data, when at least one of the two following situations occurs: said volatile memory is full or a given amount of input data, corresponding to a required amount of data that need to be stored for the recording time period of one trigger event, has already been stored.

When power supply is removed from the data logging system and no trigger event has occurred, the input data stored in the volatile memory of the peripheral storage device can be lost without being copied into the non-volatile memory of the peripheral storage device.

The volatile memory of the peripheral storage device may be a RAM (Random Access Memory) or a cache memory. The non-volatile memory of the peripheral storage device may be a flash memory, like a NAND flash memory.

The interface system is for example a PCI Express (Peripheral Component Interconnect Express) interface. Other types of memory interfaces can also be used, like an UFS (Universal Flash Storage) interface.

Advantageously, when the input data are being collected by the processing unit, said input data are directly transferred to the storage device.

A second aspect of the disclosure concerns a product equipped with the data logging system above defined. The product may be a moving body, like an automotive vehicle or a plane, or any other device, for example a medical device.

A third aspect of the disclosure concerns a non-transitory computer readable medium comprising program instructions for causing a data logging system for collecting and storing input data, said data logging system comprising a processing unit that collects input data and a peripheral storage device, connected to the processing unit via an interface system, for recording event data in a non-volatile memory, said event data being input data stored for a recording time period relative to a time zero representing a time when a trigger event occurs, to: store the input data in a volatile memory of the peripheral storage device, when input data are being collected, and when a trigger event occurs, make a copy of stored input data from said volatile memory of the peripheral storage device into said non-volatile memory of the peripheral storage device.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
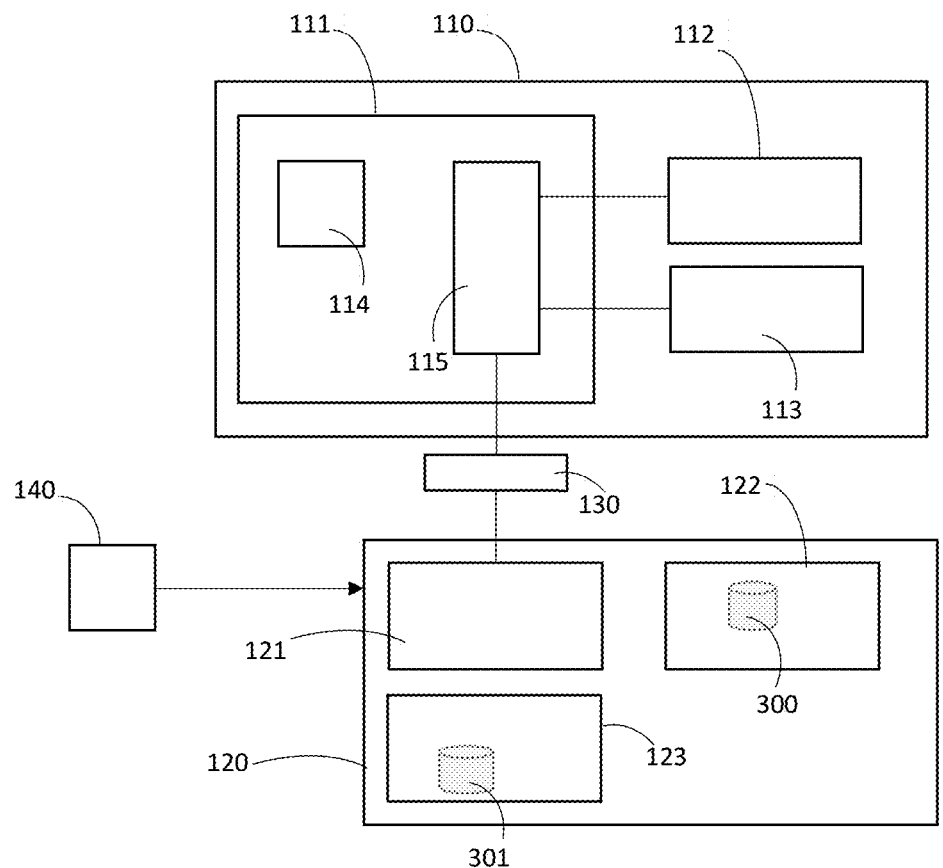
FIG. 1 shows a data logging system, according to an exemplary embodiment.

FIG. 1 illustrates an example data logging system 100 for collecting and storing input data 300. The data logging system 100 may equip an automotive vehicle 200 having for example an autonomous driving functionality and/or one or more ADAS (Advanced Driver-Assistance System(s)). However, the data logging system 100 may equip any other product. This product may be a moving body, like a plane, or any other device, for example a medical device.

The data logging system 100 is a computing system that has a computing platform 110 and a peripheral storage device 120. The computing platform 110 has a processing unit 111, or CPU (Central Processing Unit), a volatile system memory 112 and a non-volatile system memory 113. The data logging system 100 may have one or more processing units 111. For the purpose of simplicity, one processing unit 111 is represented in the FIG. 1.

The processing unit 111 has at least one CPU core 114, or CPU processor(s), and a memory controller 115 for controlling the volatile system memory 112 and the non-volatile system memory 113.

The volatile system memory 112 and the non-volatile system memory 113 are both system or computer memories, where the processing unit 111 holds current programs and data that are in use. The system memories 112 and 113 are attached to the processing unit 111 and necessary to have the processing unit 111 operate. The volatile system memory 112 is a volatile memory, for example a RAM (Random Access Memory), serving as a temporary storage and a working space for the processing unit 111, in particular for an operating system and application(s) that are in use. The non-volatile system memory 113 is a non-volatile memory, for example a flash storage unit, that stores the operating system and one or more applications, that can be used by the processing unit 111.

The storage device 120 is a peripheral storage device connected to the processing unit 111 through an interface system 130, for example a PCI Express (Peripheral Component Interconnect Express) interface or an UFS (Universal Flash Storage) interface. It is an additional storage device, different from the system memories 112 and 113 attached to the CPU 111. The storage device 120 is not necessary for the processing unit 111 to operate. The storage device 120 may be a mass storage device.

A role of the storage device 120 is to store event data 301, even when power is removed from the data logging system 100. The expression "event data", referenced as 301, can be defined as the input data 300 that are recorded for a recording time period relative to a 'time zero' representing a time when a trigger event occurs. A trigger event can be defined as an event that triggers a permanent storage of an event data set in the data logging system 100. It is an event that a user or an operator may want to analyze later (after the trigger event) on the basis of the event data permanently stored. Where the data logging system 100 equips a moving body, such as a vehicle, having a power supply device that supplies power to the data logging system 100, the trigger event may be an impact event of the moving body, a crash event of the moving body, a power down event of the battery, a deceleration event of the moving body or any other event that an operator may want to analyze later. For example, the trigger events used in the present disclosure may be specified within regulations for event data recorders.

The recording time period for the event data may start before the time zero (that is, before the time of the trigger event) and ends at the time zero or after the time zero (for example depending on the type of data elements). The duration of time of the recording time period may be specified by regulations or a manufacturer. It is for example several seconds before the time zero and several milliseconds or a few seconds after the time zero.

The storage device 120 has a controller 121, a volatile memory 122 and a non-volatile memory 123.

The volatile memory 122 can be for example a RAM (Random Access Memory) that has a linear organization or a cache memory. A part of the volatile memory 122 holds the input data 300 that may be implemented as a ring buffer.

The non-volatile memory 123 can be for example a flash storage unit, for example a NAND flash memory.

A first role of this volatile memory 122 is to serve as a temporary storage and working space for operations of the controller 121. In the present disclosure, a second role of this volatile memory 122 is to serve as a temporary storage of input data 300 in case that a trigger event occurs and a data permanent storage in the non-volatile memory 123 must be performed. The volatile memory 122 stores the input data 300 that is transferred by the processing unit 111 when the input data 300 is being collected. Under control of the controller 121, the data temporary stored in the volatile memory 122 is either copied to the non-volatile memory 123 when a trigger event occurs, in order to perform a permanent storage of event data, or the oldest data stored in the volatile memory 122 is overwritten by newest input data without being copied to the non-volatile memory 123 when no trigger event occurs.

As previously indicated, the volatile system memory 112 of the processing unit 111 serves as temporary storage and working space for operating the processing unit 111. This volatile system memory 112 of the processing unit 111 is different from the volatile memory 122 of the storage device 120 that is connected to the processing unit 111 via the interface system 130 and which role is to record event data in the non-volatile memory 123 for example for later analysis of these event data.

The data logging system 100 has one or more other interface systems (not represented) through which the processing unit 111 receives the input data 300. These input data 300 may come from various data source units like sensors, measurement units, data receivers, etc. The data source units may equip the vehicle 200 (or more generally the product equipped with the data logging system 100). Some particular data source units may be external to the vehicle 200 (or product equipped with the data logging system 100). In such a case, the external data sources may need an interface to the vehicle (or to the product).

In usual operation, the data logging system 100 is powered by a first power supply. This first power supply can be a battery for example. For example, in a vehicle, the data logging system 100 is powered by an automotive battery. When a trigger event occurs, power may at the same time be removed from the data logging system 100 (but, this is not always the case when a trigger event occurs). In other words, in certain circumstances, power supply from the first power supply may be interrupted. In such a situation, a second power supply, that is a backup power supply device 140, is used. There are different possible implementations for this second power supply. For example, it can be a battery. Alternatively, it can be energy stored in one or more capacitors. The vehicle 200 (or more generally the product equipped with the data logging system 100), or the data logging system 100 itself, is equipped with such a backup power supply device 140. In case of a loss of first power supply where a trigger event occurs, the backup power supply device 140 supplies power only to the storage device 120, so that a copy of the event data from the volatile memory 122 to the non-volatile memory 123, within the storage device, can be safely made.

Figure 2:
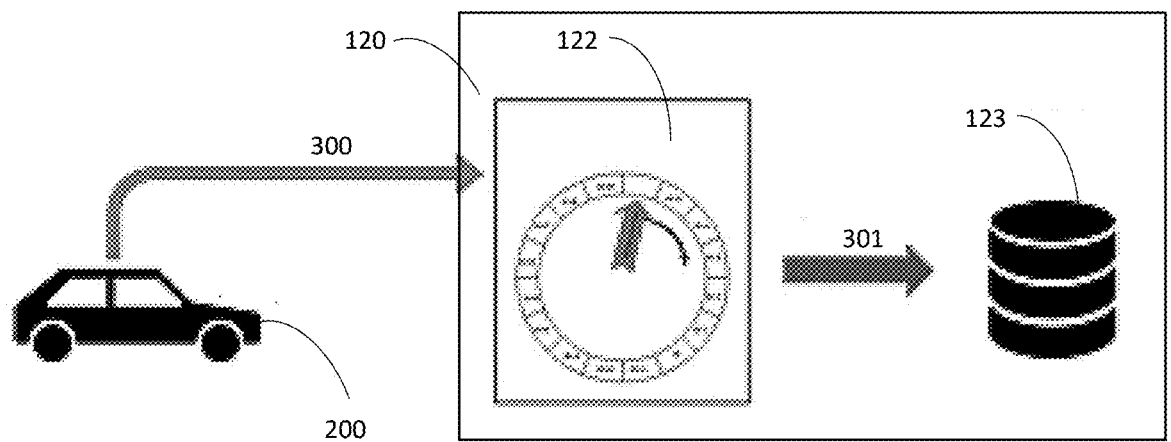
FIG. 2 shows an automotive vehicle integrating the data logging system of FIG. 1.
Figure 3:
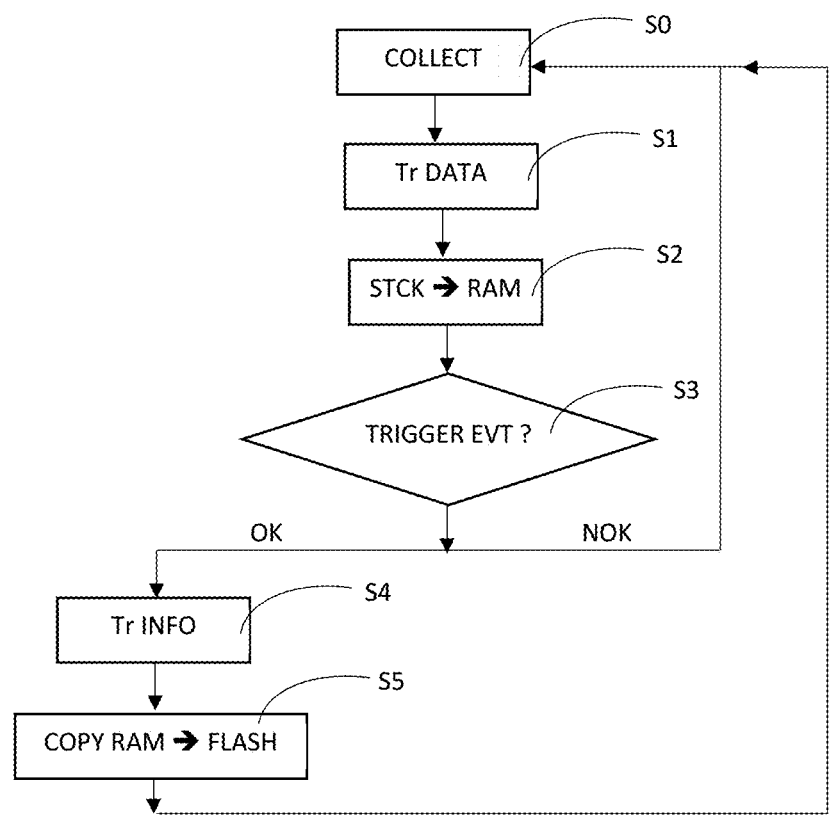
FIG. 3 is an exemplary and simplified flow chart showing how the data logging system of FIG. 1 works.

The operation of the data logging system 100 will now be described, with reference to FIGS. 2 and 3.

In the present exemplary embodiment, the data logging system 100 equips an automotive vehicle 200 equipped with a plurality of data source units including sensor(s), like a camera, LiDAR sensor, a RADAR sensor, measurement unit(s), like an IMU (Inertial Measurement Unit), and data receiver(s), like a GPS receiver, etc. These data source units (sensor(s), measurement unit(s) and data receiver(s)) may provide data for autonomous driving of the vehicle 200 or for one or more ADAS of the vehicle 200. Some data source units may also provide intermediate calculation results from a software, that can result from a fusion of several sensor's data. Such data can be e.g. an "occupancy grid" or a "trajectory" which represents a driving plan. Some of the intermediate calculation results can be also of interest to be stored in the data logging system as part of the input data.

In operation, the data source units transmit data, as input data 300, to the processing unit 111. Thus, these input data 300 are continuously being collected by the processing unit 111 over time, at step S0.

Advantageously, when the input data 300 is being collected by the processing unit 111, these input data 300 is being transferred to the storage device 120 through the interface system 130 over time, at step S1. The interface speed of interface 130 can be higher than the data rate of input data 300. In such a case, the input data 300 can be arranged in data packets that are transferred to the storage device 120 in a non-continuous manner. In such a case, the input data 300 is transferred in bursts of data, one packet after the other, to the storage device 120. Overall, this achieves a continuous stream of input data 300 from the processing unit 111 to the storage device 120 where no input data 300 can be lost.

In addition, at step S1, the input data 300 can be directly transferred from the processing unit 111 to the storage device 120, when these input data 300 is being received by the processing unit 111. Indeed, in order to reduce the risk of data loss in case of loss of power supply, the input data 300 can be directly transferred to the storage device 120, that is, without delay except for the time necessary to proceed with the data transfer. The time necessary to proceed with the data transfer can correspond to the time needed to arrange the input data 300 in data packets that are transferred to the storage device 120 in bursts of data, one packet after the other, as the interface speed of interface 130 may be higher than the data rate of input data 300. It should also be mentioned that the input data 300 can be primarily used by the processing unit 111, for example for calculating driving decisions for autonomous driving. For the purpose of using the input data 300 by the processing unit 111, the input data 300 is also stored in the memory 112 attached to the processing unit 111.

In the storage device 120, the transferred input data 300 is stored at first in the volatile memory 122, at step S2. As a part of the volatile memory 122 that holds the input data 300 is organized as a ring buffer memory, when said volatile memory is full (and no trigger event occurs), a subsequent write of new input data in the volatile memory 122 is performed by overwriting the oldest stored input data, in the step of storing S2. In a particular embodiment, overwriting of data in the volatile memory 122 does not only start when the volatile memory 122 is full. Considering a given rate of input data rate (x Megabyte per second) and a required recording time period (y seconds) for one trigger event to span around time zero, a required amount of data 'A' that need to be stored for the recording time period of one trigger event can calculated as follows:

$$A = x*y$$

This amount of data 'A' corresponds to the required amount of memory that the ring buffer of the volatile memory 122 must be able to store. When this amount of data is exceeded, that is, when a amount of data, corresponding to this required amount of data 'A', has already been stored in the volatile memory 122, then an overwriting of data is performed to store new input data in the volatile memory 122.

At step S3, the processing unit 111 determines whether or not a trigger event occurs. The determination whether or not a trigger event occurs is well known by the person skilled in the art and will not be described in the present disclosure.

When a trigger event occurs (branch 'OK' in FIG. 3), like a crash event, the processing unit 111 informs the controller 121 of the storage device 120, at step S4. Then, at step S5, a copy of input data 300 currently stored in the volatile memory 122 of the storage device 120 into the non-volatile memory 123 of the storage device 120 is made, as an event data set, under control of the controller 121. All data or only a part of all the data currently stored in the volatile memory 122 may be copied to the non-volatile memory 123. It depends on the event data that need to be recorded.

When the set of event data has been copied to the non-volatile memory 123, after step S5, the system 100 may go back to step S0 to continue to collect input data.

Then, when a further trigger event occurs, the event data already stored in the non-volatile memory 123 (that may include one or more event data sets corresponding to one or more respective trigger events) is advantageously not overwritten. New event data can be added to the already stored event data using available memory in the non-volatile memory 123. In other words, in some embodiments, the non-volatile memory 123 stores a plurality of event data sets, corresponding to a plurality of trigger events. Copies of event data in the non-volatile memory 123 can be made until a predetermined maximum amount of data is stored. This predetermined maximum amount of data can correspond to the storage capacity of the non-volatile memory or to the storage capacity of a part of said non-volatile memory that is allocated for event data storage. When the amount of data stored in the non-volatile memory has reached this maximum amount, the oldest event data can be overwritten with the newest event data, according to a first option. Alternatively, according to a second option, copying of further event data can be blocked until the plurality of event data sets have been analyzed and the event data sets have been erased by an operator. The selected option can depend on the operator or regulatory requirements.

In case power (supplied by the first power supply) is removed from the data logging system 100 when the trigger event occurs, the backup power supply device 140 supplies power advantageously only to the storage device 120, at least temporarily, in order to allow the copy of the event data from the volatile memory 122 to the non-volatile memory 123 within the storage device 120.

When no trigger event has occurred (branch 'NOK' in FIG. 3), the process goes back to step S0 and the input data 300 continue being collected.

When power supply is removed from the data logging system 100, at any time (for example because the system is shut down voluntarily by a user or an operator), and when there is no trigger event, the input data 300 currently stored in the volatile memory 122 of the storage device 120 is not being copied into the non-volatile memory 123 and therefore can be lost. In some software implementation, when the user initiates a shutdown of the system, a clean-up of the memory can be done where previously allocated memory is declared as free.

When no trigger event occurs, the input data stored in the volatile memory 122 of the peripheral storage device 120 is either overwritten by new input data or lost (that is, not copied to the non-volatile memory 123) in case of a system shutdown or power loss without trigger event.

In the particular embodiment described, the data logging system 100 equips an automotive vehicle 200. In other embodiments, the data logging system 100 may equip any other moving body, for example a plane. In that case, the data logging system makes a copy of the stored input data from the volatile memory 122 into the non-volatile memory 123, within the peripheral storage device 120, when one of the predetermined events of the group including an impact event of the moving body, a crash event of said moving body, a deceleration event of said moving body and a power down event of a battery that supplies power to the data logging system. Other trigger event may be considered, as previously indicated in the present disclosure. In other embodiments, the data logging system may be integrated in a product that is not a moving body, like a medical device. In that case, a trigger event may be that power is removed unexpectedly from the medical device.

The present disclosure also concerns a non-transitory computer readable medium comprising program instructions for causing the data logging system 100, to perform the steps previously described, in particular: store the input data 300 in the volatile memory 122 of the peripheral storage device, when input data 300 is being collected, and when a trigger event occurs, make a copy of stored input data from the volatile memory 122 of the storage device 120 into said non-volatile memory 123 of the storage device 120, as an event data set.

The program instructions are stored in a storage module related to the vehicle, such as volatile memory, e.g. RAM, etc., and/or non-volatile memory, e.g. ROM, Flash (for example NAND flash), etc., that is permanently or removably integrated in the vehicle or connectable to the vehicle, e.g., via the 'cloud', and can be executed by a computer, or a calculator of the vehicle, such as one or more modules of electronic control units (ECUs). The program instruction can be at least partially stored in the storage device 120.

In the vehicle 200, the data logging system 100 can be either a separate hardware unit that is built into the vehicle 200 or an integrated part of some other autonomous driving or ADAS system controller.

What is claimed is:

1. A system comprising:
    a computing platform comprising a processing unit configured to collect input data from a vehicle and store the input data, prior to a trigger event, within a volatile memory of the computing platform and within a volatile memory of a peripheral storage device that is separate from the computing platform;
    a Peripheral Component Interconnect Express (PCI Express) interface or a Universal Flash Storage (UFS) interface between the processing unit and the peripheral storage device, the PCI Express interface or the UFS interface having an interface speed that is higher than a data rate of the input data; and
    the peripheral storage device comprising a controller configured to, when the trigger event occurs, make a copy of at least a portion of the input data that corresponds to a recording time period relative to a time zero when the trigger event occurs from the volatile memory of the peripheral storage device into non-volatile memory of the peripheral storage device.

2. The system of claim 1, wherein the peripheral storage device is further configured to make a plurality of copies of input data stored in the volatile memory of the peripheral storage responsive to a plurality of respective trigger events.

3. The system of claim 1, wherein the input data corresponds to data usable by an autonomous driving (AD) system or an advanced driver assist system (ADAS).

4. The system of claim 1, wherein the volatile memory of the computing platform is configured to serve as temporary storage and working space for operating the processing unit.

5. The system of claim 1, wherein the system further comprises a backup power supply device configured to supply power only to the peripheral storage device.

6. The system of claim 1, wherein the trigger event comprises an impact event of the vehicle, a crash event of the vehicle, a deceleration event of the vehicle, or a power down event of the vehicle.

7. The system of claim 1, wherein:
    the volatile memory of the peripheral storage device comprises a ring buffer memory; and
    the processing unit is further configured to store new input data to the volatile memory of the peripheral storage device by overwriting the oldest stored input data, when at least one of the two following situations occurs:
        the volatile memory of the peripheral storage device is full; or
        a given amount of input data, corresponding to a required amount of data that needs to be stored for the recording time period of one trigger event, has been stored.

8. The system of claim 1, wherein the volatile memory of the peripheral storage device is a Random Access Memory (RAM) or a cache memory.

9. The system of claim 1, wherein the non-volatile memory of the peripheral storage device is a flash memory.

10. The system of claim 1, wherein the input data is directly transferred to the peripheral storage device as it is collected by the processing unit.

11. The system of claim 1, wherein the processing unit is further configured to store the input data within the volatile memory of the peripheral storage device by transferring the input data to the peripheral storage device, via the PCI express interface or the UFS interface, as bursts of input data.

12. A method comprising:
collecting, by a processing unit of a computing platform, input data from a vehicle;
storing, by the processing unit and prior to a trigger event, the input data within a volatile memory of the computing platform and within a volatile memory of a peripheral storage device, that is separate from the computing platform, via a Peripheral Component Interconnect Express (PCI Express) interface or a Universal Flash Storage (UFS) interface between the processing unit and the peripheral storage device, the PCI Express interface or the UFS interface having an interface speed that is higher than a data rate of the input data; and
responsive to the trigger event, copying, by a controller of the peripheral storage device, at least a portion of the input data stored for a recording time period relative to a time zero representing a time when the trigger event occurs from the volatile memory of the peripheral storage device into a non-volatile memory of the peripheral storage device.

13. The method of claim 12, further comprising making, by the peripheral storage device, a plurality of copies of input data stored in the volatile memory of the peripheral storage responsive to a plurality of respective trigger events.

14. The method of claim 12, wherein the input data corresponds to data usable by an autonomous driving (AD) system or an advanced driver assist system (ADAS).

15. The method of claim 12, further comprising using the volatile memory of the computing platform as temporary storage and working space for operating the processing unit.

16. The method of claim 12, further comprising, responsive to a loss of electrical power, supplying power, via a backup power supply device, only to the peripheral storage device.

17. The method of claim 12, wherein the trigger event comprises an impact event of the vehicle, a crash event of the vehicle, a deceleration event of the vehicle, or a power down event of the vehicle.

18. The method of claim 12, wherein:
the volatile memory of the peripheral storage device comprises a ring buffer memory; and
the method further includes storing, by the processing unit, new input data to the volatile memory of the peripheral storage device by overwriting the oldest stored input data, when at least one of the two following situations occurs:
the volatile memory of the peripheral storage device is full; or
a given amount of input data, corresponding to a required amount of data that needs to be stored for the recording time period of one trigger event, has already been stored.

19. The method of claim 12, wherein the storing the input data within the volatile memory of the peripheral storage device comprises transferring the input data to the peripheral storage device, via the PCI express interface or the UFS interface, as bursts of input data.

20. At least one non-transitory computer readable medium comprising program instructions for causing:
a processing unit of a computing platform to collect and store, prior to a trigger event, input data into a volatile memory of the computing platform and within a volatile memory of a peripheral storage device that is separate from the computing platform and communicatively coupled to the processing unit via a Peripheral Component Interconnect Express (PCI Express) interface or a Universal Flash Storage (UFS) interface, the PCI Express interface or the UFS interface having an interface speed that is higher than a data rate of the input data; and
a controller of the peripheral storage device to, responsive to the trigger event, copy at least a portion of the input data that corresponds to a recording time period relative to a time zero when the trigger event occurs from the volatile memory of the peripheral storage device to a non-volatile memory of the peripheral storage device.

* * * * *